US012559684B2

(12) United States Patent　　　(10) Patent No.:　US 12,559,684 B2
Martinez　　　　　　　　　　　　(45) Date of Patent:　　Feb. 24, 2026

(54) CONTINUOUS-FLOW PYROLYSIS REACTOR, POSITIVE-PRESSURE FEED HOPPER FOR PYROLYSIS REACTOR, KILN FOR PYROLYSIS REACTOR, AND PYROLYSIS SYSTEM

(71) Applicant: Luis Fernando Martinez, Sao Paulo (BR)

(72) Inventor: Luis Fernando Martinez, Sao Paulo (BR)

( * ) Notice: Subject to any disclaimer, the term of this patent is extended or adjusted under 35 U.S.C. 154(b) by 179 days.

(21) Appl. No.: 18/264,453

(22) PCT Filed: Feb. 9, 2022

(86) PCT No.: PCT/BR2022/050044
§ 371 (c)(1),
(2) Date: Aug. 7, 2023

(87) PCT Pub. No.: WO2022/170412
PCT Pub. Date: Aug. 18, 2022

(65) Prior Publication Data
US 2024/0301291 A1　　Sep. 12, 2024

(30) Foreign Application Priority Data
Feb. 10, 2021　　(BR) ......................... 1020210025140

(51) Int. Cl.
*C10B 31/04*　　　　(2006.01)
*B01J 6/00*　　　　(2006.01)
(Continued)

(52) U.S. Cl.
CPC .............. *C10B 31/04* (2013.01); *B01J 6/008* (2013.01); *B29B 17/04* (2013.01); *C10B 7/10* (2013.01);
(Continued)

(58) Field of Classification Search
CPC ........... C10B 31/04; C10B 7/10; C10B 47/44; C10B 53/02; C10B 53/07; B01J 6/008
See application file for complete search history.

(56) References Cited

U.S. PATENT DOCUMENTS 1,467,758 A　*　9/1923　Day ......................... C10G 9/02
　　　　　　　　　　　　　　　　208/126
1,884,379 A　*　10/1932　Tenney ..................... C10B 7/10
　　　　　　　　　　　　　　　　202/136

(Continued)

FOREIGN PATENT DOCUMENTS

BR　　　9802964　　5/2000
BR　　　0204067　　12/2003

(Continued)

OTHER PUBLICATIONS

Lewandowski, W. M.; Januszewicz, K.; Kosakowski, W. "Efficiency and proportions of waste tyre pyrolysis products depending on the reactor type—A review". Journal of Analytical and Applied Pyrolysis, v. 140, pp. 25-53.

*Primary Examiner* — Jonathan Miller
(74) *Attorney, Agent, or Firm* — Defillo & Associates, Inc.; Evelyn A. Defillo

(57)　　　　　　　ABSTRACT
A continuous flow pyrolytic reactor (200) equipped with one or more pyrolysis chamber assemblies (204) is disclosed. A positive pressure waste feeder hopper (100) for the pyrolytic reactor and its respective furnace, in addition to a pyrolysis system for the use of waste. The pyrolytic reactor (200) having a plurality of cylindrical pyrolysis chambers (201) provided, within it, with an endless screw conveyor (202) arranged longitudinally. The worm conveyor screw (202) is provided with a shaft (203), the shaft (203) being coupled to the bases of the pyrolysis chamber (201). The shaft (203) is further coupled to a rotation device that transfers torque to the shaft (203) by rotating the worm conveyor screw (202).

(Continued)

The cylindrical pyrolysis chambers (201) are housed in an insulating housing (300) having within it two or more assemblies (204). The assemblies (204) are fed by a hopper (100) forming a pyrolysis system.

18 Claims, 12 Drawing Sheets

(51) Int. Cl.

| | |
|---|---|
| *B29B 17/04* | (2006.01) |
| *C10B 7/10* | (2006.01) |
| *C10B 47/44* | (2006.01) |
| *C10B 53/02* | (2006.01) |
| *C10B 53/07* | (2006.01) |
| *B29K 105/26* | (2006.01) |

(52) U.S. Cl.
CPC .............. *C10B 47/44* (2013.01); *C10B 53/02* (2013.01); *C10B 53/07* (2013.01); *B29B 2017/0496* (2013.01); *B29K 2105/26* (2013.01)

(56) References Cited

U.S. PATENT DOCUMENTS

| | | | | |
|---|---|---|---|---|
| 2,398,446 | A * | 4/1946 | Phillipson | ................ C10B 7/10 |
| | | | | 202/269 |
| 4,331,448 | A | 5/1982 | Koppers | |
| 4,501,644 | A * | 2/1985 | Thomas | .................... C10B 7/10 |
| | | | | 202/99 |
| 5,129,995 | A * | 7/1992 | Agarwal | ................... C10B 7/10 |
| | | | | 75/403 |
| 6,619,214 | B2 * | 9/2003 | Walker | ................... F23G 5/444 |
| | | | | 110/255 |
| 7,832,343 | B2 * | 11/2010 | Walker | .................. F23G 5/0276 |
| | | | | 110/229 |
| 8,282,787 | B2 * | 10/2012 | Tucker | .................... C10B 53/00 |
| | | | | 95/114 |
| 8,328,993 | B2 * | 12/2012 | Feerer | .................. F23G 5/0273 |
| | | | | 202/229 |
| 8,888,874 | B1 * | 11/2014 | Borchert | ................. C10B 53/02 |
| | | | | 48/61 |
| 9,605,210 | B2 * | 3/2017 | Tucker | .................... C10B 53/00 |
| 9,724,844 | B1 * | 8/2017 | Kowalczyk | ............. B29B 7/488 |
| 10,233,393 | B2 * | 3/2019 | Oluwaseun | ............. C10B 23/00 |
| 10,633,595 | B2 * | 4/2020 | Oluwaseun | .......... C10G 70/046 |
| 10,731,082 | B2 * | 8/2020 | Tenore | .................... C10B 31/08 |
| 10,961,062 | B2 * | 3/2021 | Tenore | .................. B65G 53/26 |
| 11,407,945 | B2 * | 8/2022 | Shibata | ..................... F27B 9/14 |
| 11,613,705 | B2 * | 3/2023 | McGolden | ............. F23G 5/027 |
| | | | | 202/150 |
| 2010/0163395 | A1 * | 7/2010 | Henrich | ................. C10B 53/02 |
| | | | | 201/2.5 |
| 2013/0299333 | A1 * | 11/2013 | Tucker | .................... C10B 47/44 |
| | | | | 202/113 |

FOREIGN PATENT DOCUMENTS

| | | |
|---|---|---|
| BR | PI0900563 | 11/2009 |
| BR | MU8803150 | 9/2010 |
| BR | 102016027627 | 6/2018 |
| CN | 204490811 | 7/2015 |
| CN | 107674685 | 2/2018 |
| CN | 109205982 | 1/2019 |
| GB | 2000580 | 1/1979 |
| JP | 2000001677 | 1/2000 |
| JP | 2005127682 | 5/2005 |
| RU | 272590 | 7/2020 |

\* cited by examiner

108

102

1

CONTINUOUS-FLOW PYROLYSIS REACTOR, POSITIVE-PRESSURE FEED HOPPER FOR PYROLYSIS REACTOR, KILN FOR PYROLYSIS REACTOR, AND PYROLYSIS SYSTEM

CROSS REFERENCE TO RELATED APPLICATION

This application is a national stage entry of PCT/BR2022/050044 filed Feb. 9, 2022, under the International Convention and claiming priority over Brazilian Patent Application No. BR 10 2021 0025140 filed Feb. 10, 2021.

FIELD OF THE INVENTION

The present invention belongs to the field of chemical industry, more particularly a continuous flow pyrolytic reactor equipped with one or more pyrolysis chamber assemblies is disclosed. The invention further relates to a positive pressure waste feed hopper for the pyrolytic reactor and its respective furnace, in addition to a pyrolysis system for the use of waste.

The continuous flow pyrolytic reactor, the waste feeder hopper, the furnace and the pyrolysis system, objects of the present invention, are intended for the reprocessing of various organic or polymeric inputs, such as biomass (sugarcane bagasse, grass, fermentation residues, sludge, sawdust), in addition to tires, rubbers, plastics, elastomers and polymers in general, generally resulting in coal (carbon black, activated carbon and others) and combustible gases. In addition, pyrolytic oil is also generated, which are the condensable hydrocarbons.

The present invention works in continuous flow through the pyrolytic reactor, providing energy efficiency, much superior to the pyrolysis reactors of the state of the art, that is, the present invention offers superior performance through the feeding of materials in continuous flow to be pyrolyzed. The present invention dispenses with cooling of the equipment that reduces the productivity of the operation and impairs the quality of the carbon black.

The continuous flow pyrolytic reactor contemplates two or more sets of pyrolysis chambers with at least two or more pyrolysis chambers, equipped with carrier threads, arranged in the same direction as the pyrolysis chamber, which carries the material to be pyrolyzed.

The pyrolysis assemblies are herein understood to be a stacking of at least two preferably cylindrical shaped pyrolysis chambers that are arranged substantially on top of each other, in the same direction. The pyrolysis chambers of each assembly are preferably arranged alternately, forming two columns of pyrolysis tubular chambers for each of the assemblies.

The residue is transferred from a chamber to the immediately lower chamber through windows located at the end and beginning of each of the pyrolysis chambers. In this way, the residue winds through the interior of the pyrolysis chamber assemblies undergoing the reaction. That is, the residue is inserted into the first external pyrolysis chamber and travels one direction and, at the end of its course in the first external pyrolysis, is transferred through a window to a first internal pyrolysis chamber traveling in the opposite direction. The first inner pyrolysis chamber is positioned slightly lower relative to the outer pyrolysis chamber.

In this way, the inserted residue undergoes the pyrolysis reaction by going through the external chambers in one direction and the internal chambers in the opposite direction and transforming into pyrolysis gas and coal.

The capture of pyrolysis gases, the result of the reaction, occurs in the internal pyrolysis chambers through ducts and the coal collected in the windows of the last pyrolysis chambers of each of the assemblies.

The pyrolysis reaction occurs simultaneously in the pyrolysis chamber assemblies, greatly increasing the efficiency of the pyrolysis reactor of the present invention. In addition, the other elements contribute to the present invention, such as the oven shape that favors the circulation of heat between the pyrolysis chambers, taking better advantage of the heat and distributing the temperature evenly for heating the pyrolysis chambers.

The present invention further comprises a positive pressure continuous flow hopper for pyrolytic reactor. The hopper outlet has two pressed waste conductor tubes, each tube feeding a set of pyrolysis chambers that are arranged inside an insulating housing.

The hopper, the furnace insulating housing and the pyrolysis reactor form the pyrolysis system of the present invention.

STATE OF THE ART

Pyrolysis reactors have been routinely used in wastewater recycling processes in the recycling industry and are presented in various dimensions and capacities, generating use of wastewater constituents in the form of combustible products, carbon for the pigment industry and as a load for new rubbers. Recyclers have continuously sought ways to improve the yield of pyrolysis and pyrolyser processes, achieving higher yield and productive capacity.

In general, the phenomenon of pyrolysis consists in the thermal decomposition of the material to be pyrolyzed through heat, in the presence of an inert atmosphere, or in the suppression, or substantially absence, of oxygen.

As we know, oxygen completes the "fire triangle" of combustion, that is, oxygen, fuel and heat, when combined, result in combustion, a phenomenon that should be avoided in the pyrolysis process.

If oxygen is present during the pyrolysis process we will have the incineration of the material (oxidation), which is not desired. Oxygen is thus suppressed or substantially eliminated, thus allowing the incidence of large amounts of heat on the material to be pyrolyzed and preventing it from combusting, occurring only the desired decomposition of the material into its main constituents, which once heated, liquefy and vaporize.

The vapors resulting from pyrolysis are usually taken to storage or used as fuels in the pyrolysis process itself.

Pyrolysis processes are commonly used for the recycling of unserviceable materials, such as tires, rubbers, plastics and many others that have thermal decomposition characteristics.

The present invention aims to present an optimized pyrolysis system that has greater installed production capacity due to its continuous flow of pyrolysis and greater energy use.

In the state of the art are found pyrolytic reactors of continuous flow. However, these reactors do not exhibit the energy efficiency of the present invention.

Patent document BR 102016027627-6 discloses a continuous flow pyrolytic reactor equipped with a single set of pyrolysis chambers. The pyrolysis chambers are arranged on top of each other in line. In the pyrolytic reactor of said patent document, a furnace is used as a heat source, which is coupled to the pyrolytic reactor with continuous flow by means of blowtorches. This configuration of the torches is disadvantageous, as it does not take advantage of the heat in the best way, which makes the process less efficient. That is, in the invention of the prior art, heat is not distributed equally. In addition, the use of carbon black as a fuel is not ideal, as this product has a high brand value. In addition, when burned it produces a lot of ash and intense smoke in combustion that need to be further treated, generating undesirable production costs.

The present invention advantageously presents at least two sets of pyrolysis chambers strategically arranged within an insulating housing for better use of heat and, as a consequence, better energy efficiency of the pyrolysis process. In order to make pyrolysis even more efficient, the shape of the housing assists in the uniform heating of the pyrolysis chambers which is carried out by means of a gas burner flute introduced into the interior of the insulating housing.

In the present invention, advantageously heat is evenly diffused between the pyrolysis chambers using two mechanisms that work synergistically.

The first is a heat diffuser plate shaped like a concave cylindrical surface that is heated inferiorly by one or more gas burner flutes diffusing heat into the pyrolysis chambers efficiently and uniformly.

The gas burned in the flutes is the very gas of the pyrolysis process, having a surplus of gas for sale of 80%, which is a much higher efficiency than the reactors of the state of the art.

The second mechanism deals with a horizontal sheet of refractory material disposed between the larger sides of the housing and the heat diffusing concave sheet. Through orifices, the air heated by the flutes passes through the horizontal plates and rises between the larger inner side walls of the housing and the pyrolysis chambers of each of the assemblies.

The pyrolysis chambers of the present invention are still alternately positioned having a spacing therebetween that favors the circulation of hot air. This arrangement presented even better results of efficiency of the pyrolysis process.

In addition, the hot air, when rising through the inner sides of the housing of the present invention, encounters its upper portion in a curved shape. With this, the hot air is directed to the top of the carcass, which is strategically positioned between the two sets of pyrolysis chambers. The warm air at a slightly lower temperature then descends into the central space of the housing (between the two sets) promoting optimal air circulation between the pyrolysis chambers. This circulation promotes uniform heat distribution which increases the energy efficiency of the reactor of the present invention.

In addition, the pyrolysis gas collection ducts were positioned in the central portion of the housing to receive this heat that descends through the central column. By receiving this heat from the central column, advantageously, oil condensation in the gas collection ducts is avoided. In the state of the art, oil condensation in the pipelines is common, and this condensed oil is often wasted. Thus, the present invention advantageously avoids oil condensation in the pipes and their waste.

That is, in the present invention, there is no waste provided a production of pyrolysis gas, oil and coal much higher than the state of the art with a lower gas consumption.

Document BR 102016027627-6 further discloses a rotary valve for the control of air intake into the pyrolysis chambers. Air intake control is critical to prevent oxygen from entering the pyrolysis environment, which can cause combustion (oxidation) of the material to be pyrolyzed and consequently explosions, due to the highly reactive nature within the pyrolytic reactor. This rotary valve does not provide the insertion of lightweight materials into the reactor, since it depends on the force of gravity for the materials to pass from one chamber to the other. That is, it does not work with lightweight materials, such as fine plastics or biomasses such as grass and foliage. In the present invention, the hopper has positive pressure, that is, the materials are forced into the hopper for compaction and removal of air, operating in truly continuous flow and with large volumes of material.

Patent document CN204490811 discloses a pyrolysis reactor equipped with a set of pyrolysis tubular chambers. The pyrolysis chambers are equipped with a helical conveyor.

In this reactor of the state of the art, to prevent the entry of oxygen together with the tailings, nitrogen is injected into the feed tube. Also, when the device is working, the feed tube is filled with glue. This way of eliminating oxygen is disadvantageous, as it requires the use of glue and nitrogen injection, which adds some inputs to the pyrolysis process.

The hopper of the present invention does not require any additional input, the tailings are compacted for entry into the reactor by means of an endless thread, having the diameters of the threads descending and provided with holes for the exit of the air. Thus, it is possible to promote compaction and removal of air in a truly continuous way, in large volumes and without the need for maintenance stops. In addition, the compacted waste outlet is provided with at least two simultaneous outlets for the pyrolytic reactor feed. In these outlets, there are diameter reducers to reduce the waste inlet flow and consequent compression thereof, providing the air outlet, preventing oxygen from entering the system, which impairs the chemical reaction of pyrolysis.

Therefore, the hopper of the present invention is more efficient than those of the state of the art, does not use inputs and is in perfectly continuous flow and can operate uninterruptedly for several days without any stop or introduction of inputs.

Patent document JP2005127682 relates to an induction heated pyrolytic reactor, i.e. equipped with an electromagnetic coil for individual heating of each of the pyrolysis cameras. The invention of the state of the art is disadvantageous because it uses electrical energy, often more expensive than gas.

Furthermore, advantageously, the present invention uses the gas itself generated in the pyrolysis process for burning in one or more flutes of the gas and heating the pyrolysis chambers which is efficient due to the arrangement of the pyrolysis chambers and the housing. Thus, the invention is self-sustained in gas, requiring only an initial supply of gas for reactor start-up. Thus, as soon as the reactor begins to produce pyrolysis gas, it is injected into the flutes and the initial gas supply can be withdrawn. One of the main advantages of the present invention is that there is a surplus of gas production of 80% that can be marketed in the market.

The waste feed valve used in JP2005127682 is quite distinct from the hopper of the present invention. In the Japanese document the valve consists of two shutters being a primary disposed at the top of the inlet port and a secondary shutter disposed at the bottom portion. This supply system is equipped with a rotary valve that rotates in 45° with two openings, one of which is open for the fall of waste by gravity to the other closed. They work synchronously so that there is no air inlet, that is, when one opens to the waste inlet, the other is closed.

This configuration seeks to prevent air from entering the pyrolysis reactor, however it is not efficient in eliminating air. In addition, it does not provide the feed of waste in a truly continuous flow.

In addition, when using light residues in this type of valve in the state of the art, it is very common for waste jamming to occur disadvantageously and the pyrolysis process needs to be stopped.

The hopper of the present invention is extremely advantageous as it works efficiently for both heavy and lighter materials such as grass and cardboard. The worm thread with the largest diameter in the upper portion of the hopper of the present invention forces entry of the material into the medial part of the hopper. This functionality ended the difficulty of feeding lighter materials that did not work well in this prior art rotary valve model that depends on gravity.

The present invention as a whole depends very little on the action of gravity to function since the entire process is forced through the endless threads, including the transition of the residue between the pyrolysis chambers, where a blade at the end of the endless thread stroke pushes the pyrolysis process residues into the next chamber.

Thus, the pyrolysis reactor of the present invention is very stable and efficient, operating truly in continuous flow (24 hours a day and seven days a week) without stops for maintenance or interruptions of the process due to waste jams or clogging of the pyrolysis gas collection pipelines by condensation of oil and condensable hydrocarbons.

SUMMARY OF THE INVENTION

The present invention discloses a continuous flow pyrolytic reactor comprising a plurality of cylindrical pyrolysis chambers endowed, within it, with a longitudinally arranged worm conveyor thread. The worm conveyor screw is provided with a shaft, said shaft being coupled to the bases of the pyrolysis chamber. The shaft is further coupled to a rotation means which transfers torque to said shaft by rotating the worm conveyor screw. The cylindrical pyrolysis chambers are further housed in an insulating housing comprising within it two or more sets of cylindrical pyrolysis chambers.

The present invention further discloses a positive pressure feeder hopper for the continuous flow pyrolytic reactor provided with an enlarged upper portion, where waste is deposited. The upper portion is pierced longitudinally by a worm-pressing helical thread in the vertical position. The helical thread is further fixed on a rotating shaft that couples to a rotating means. The hopper further comprises a tubular medial portion, narrower than the upper portion, the tubular medial portion being longitudinally traversed by the worm-pressing helical thread. The rotating shaft is coupled by means of a bearing on a fork at the beginning of a lower portion of the hopper. The bifurcation originates at least two pressed waste conductor tubes that couple to each of the continuous flow pyrolytic reactor assemblies.

Also taught herein is a pyrolytic reactor furnace provided with an insulating housing with substantially parallelepipedal shape. The closure of the upper portion of the housing is shaped substantially in a longitudinal cylindrical section, where the apex of the upper face (3011) is parallel to the longitudinal axis of the parallelepipedal portion of the housing, its lower portion being provided with a heat diffuser plate in the shape of a cylindrical surface, its apex being positioned downwards. The heat diffuser plate (303) is further disposed above one or more flutes.

The present invention further relates to a pyrolysis system comprising a positive pressure waste feed hopper for the continuous flow pyrolytic reactor passed longitudinally by an endless screw presser in the vertical position. The helical thread is further fixed on a rotating shaft that couples to a rotating means. The hopper outlet has at least two pressed waste conductor tubes, each tube feeding a set of pyrolysis chambers that are disposed within an insulating housing.

BRIEF DESCRIPTION OF THE DRAWINGS

The present invention will hereafter be more fully described based on an example embodiment depicted in the drawings.

DETAILED DESCRIPTION OF THE INVENTION

Figure 1:
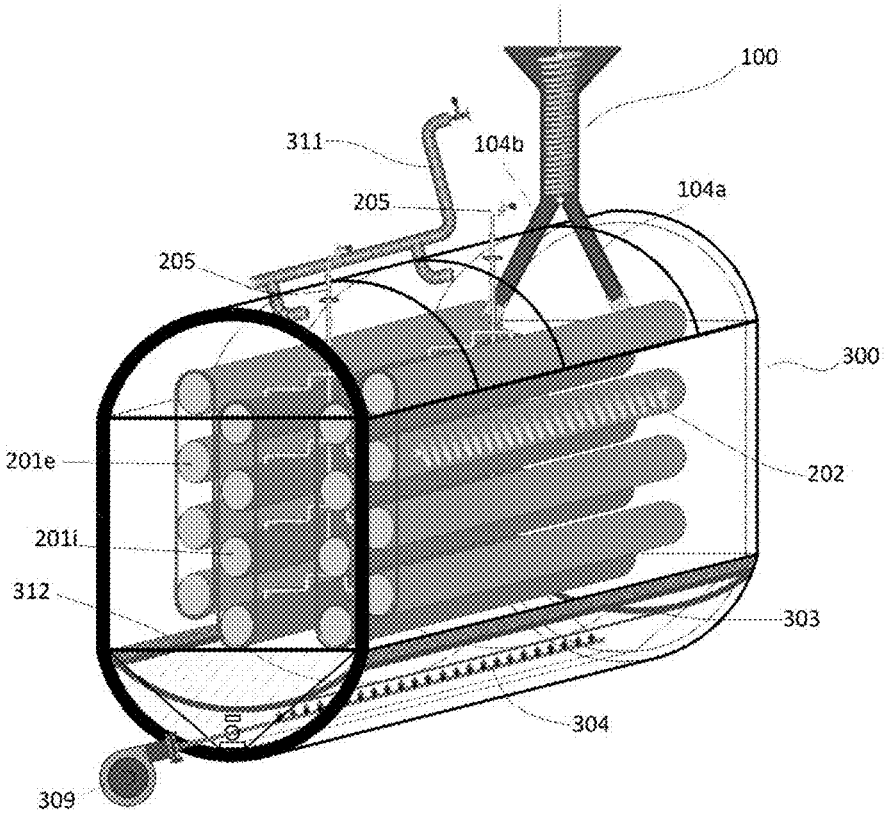
FIG. 1 is a first perspective overview of the present invention, showing the hopper, pyrolytic reactor and housing that were the pyrolytic system of the present invention.

FIG. 1 shows the overview of the pyrolysis system of the present invention comprising a positive pressure waste feeder hopper (100) that feeds with pressed, air-free and flow-through waste to the pyrolytic reactor (200).

The function of the hopper (100) is to capture the residues that are inserted into its upper portion (1010). The hopper is pierced longitudinally by a worm thread (102) endless presser in the vertical position. This helical thread (102) is further fixed on a rotating shaft (105) that couples to a rotating means (106), such as a motor.

The hopper (100) waste feeder has at least two tubes (104*a*) and (104*b*) pressed waste conductors already devoid of air (which is unwanted in the pyrolysis process). Thus, each tube (104*a*) and (104*b*) feeds a set (204) of pyrolysis chambers that are disposed within an insulating housing (300).

The flow-through pyrolysis system of the present invention has much higher energy efficiency than prior art pyrolysis systems. Energy efficiency is understood here not only by the economy achieved for the operation of the system as a whole, but mainly by the ability to convert waste into energy or products, in this case, coal, oil and gas. That is, the total energy balance is significantly improved. The gas has a higher calorific value of 42.98 (MJ/kg) at 20° C. The carbon is also of great quality, being with very low ash index, with very low humidity, with a very fine and loose granulometry and the main one is the amount of fixed carbon of 82% of the mass, being endowed, therefore, with high commercial value.

One of the reasons for the energy efficiency is that the pyrolysis process occurs simultaneously in two sets (204) of pyrolysis chambers (201), however, within the same housing (300).

The multiple pyrolysis chambers (201) are heated uniformly and therefore there is no temperature variation in the process. The form of circulation of the hot air obtained by the configuration of the furnace ensures the uniformity of the heat distribution and the efficiency of its transmission to the pyrolysis chambers (201).

The arrangement of the chambers (201) also helps in the distribution and use of heat and, as a consequence, in energy efficiency.

Figure 11:
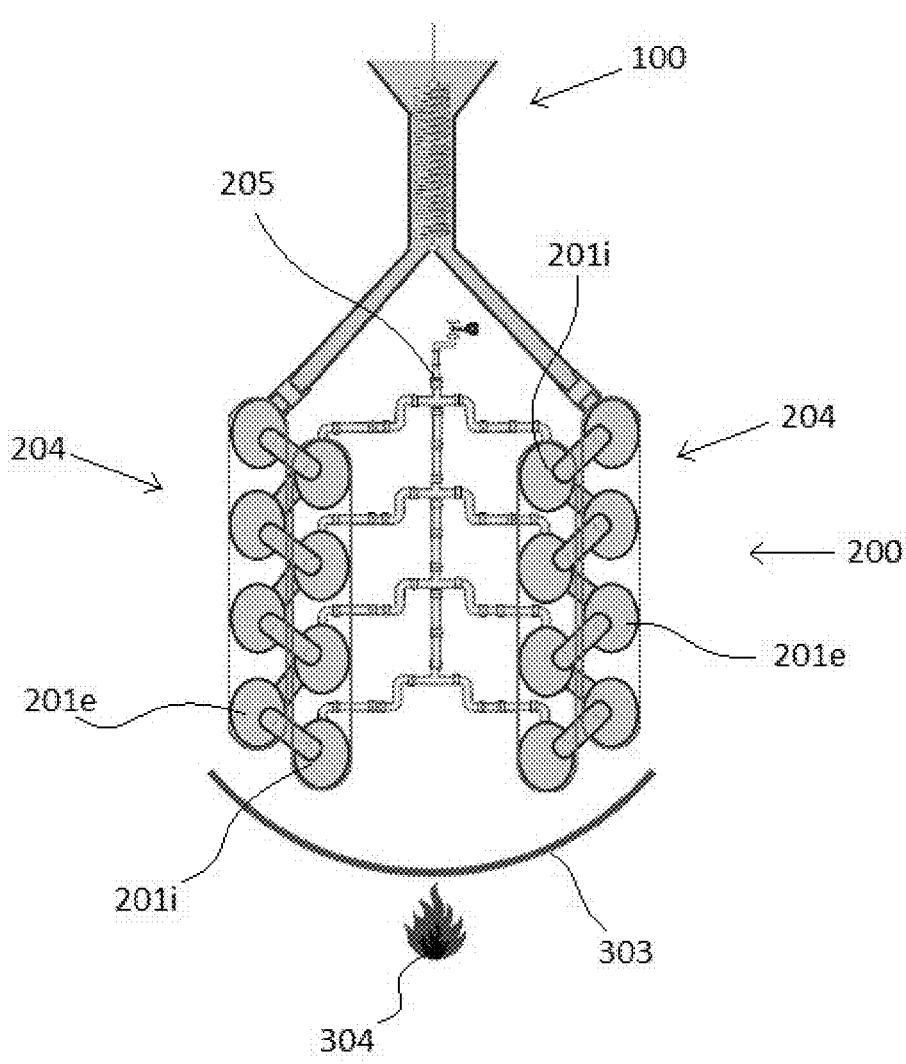
FIG. 11 shows a side view of the pyrolysis reactor, with the detail for the alternating distribution of the pyrolysis chambers.

In the present invention, preferably there is a column with four external pyrolysis chambers (201*e*) and another column with four internal pyrolysis chambers (201*i*) forming a set (204) of pyrolysis chambers, as shown in FIGS. 1 and 11. Thus, as there are preferably two pyrolysis assemblies, a total of 16 pyrolysis chambers (201) is totaled in the preferred embodiment of the present invention.

The pyrolytic reactor (200) of the present invention is of truly continuous flow. This capacity of the invention is provided by the constant feed of oxygen-free residues provided by the hopper (100), installed above the pyrolysis reactor (200), as shown in FIGS. 1 and 10.

In addition, hopper (100) is able to provide a greater amount of oxygen-free pressed tailings to simultaneously feed two sets (204) of pyrolysis chambers.

Figure 10:
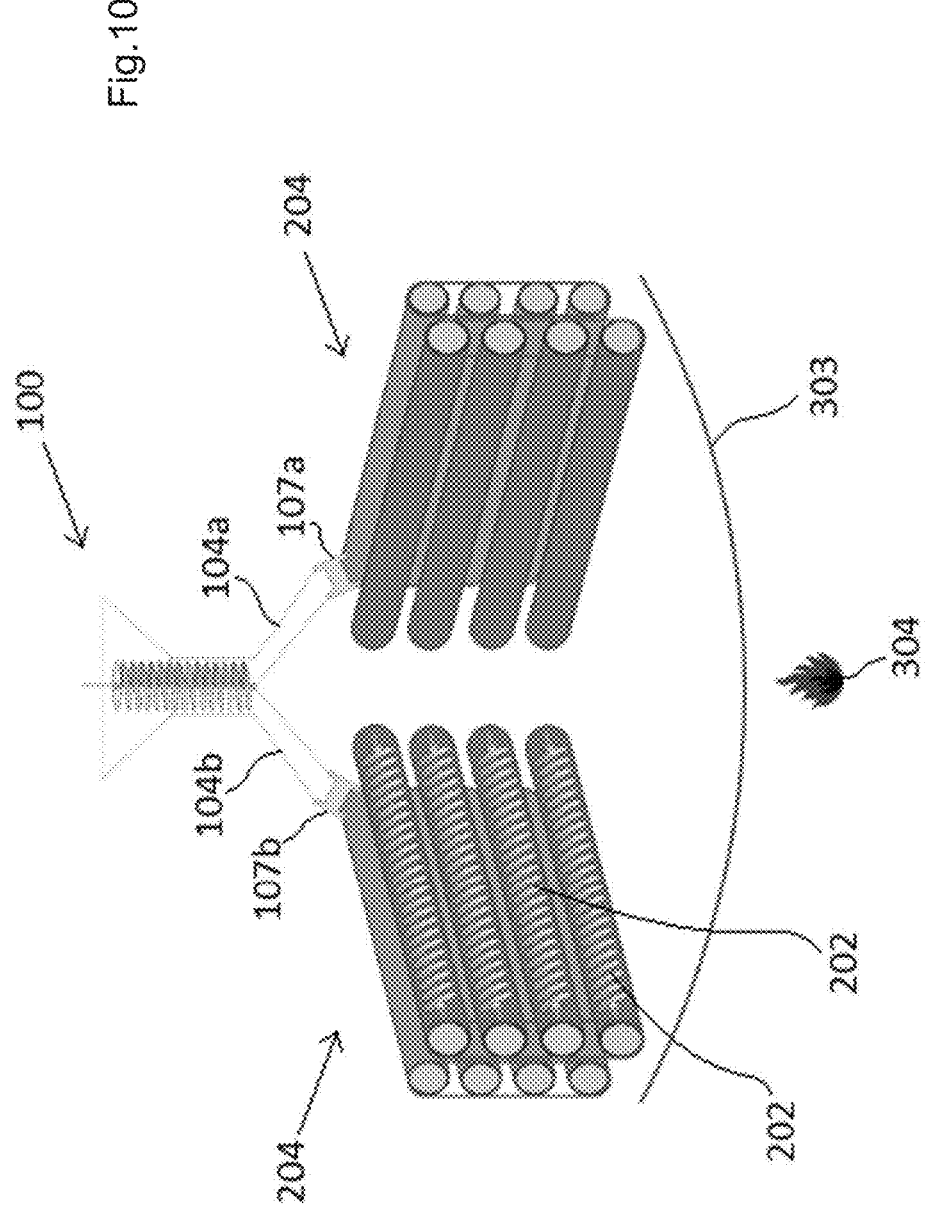
FIG. 10 shows a schematic of the reactor with a rotation of the assemblies for better visualization of the helical threads. This figure further schematically shows the hopper in the upper portion and the heat diffuser plate in the lower portion.

The cylindrical pyrolysis chambers (201) are provided, inside, with an endless screw conveyor (202) arranged longitudinally and preferably in a horizontal position, as shown in FIGS. 1 and 10.

The worm conveyor screw (202) is provided with a shaft (203), said shaft (203) being coupled to the base of the pyrolysis chamber (201) by means preferably of bearings.

The shaft (203) is further coupled to a rotational means, preferably a motor or reducing motor (not shown).

The motor may be unique for each of the assemblies (204) being the torque transferred to the shaft (203) of the pyrolysis chambers (201) by means of pulleys and belts, being the belts preferably steel.

The torque transferred to said shaft (203) rotates the helical threads (202) endless conveyors causing the residue that is undergoing the pyrolysis reaction to circulate through the pyrolytic reactor (200).

The cylindrical pyrolysis chambers (201) are housed in an insulating housing (300) comprising within it two or more sets (204) of cylindrical pyrolysis chambers (201).

The assemblies (204) allow simultaneous pyrolysis within the same housing (300). In addition, the arrangement of the pyrolysis chambers (201) alternately and spaced apart creates two columns of pyrolysis chambers on each side of the pyrolytic reactor (200), favoring the distribution of heat.

Thus, the assemblies (204) are provided with a plurality of cylindrical pyrolysis chambers (201), the axes (203) of the pyrolysis chambers (201) of each of the assemblies being arranged on top of each other forming a pair of columns in each of the assemblies (204). The columns are shifted vertically so that pyrolysis chambers (201) are shifted alternately. Preferably, the distance of the axes of the chambers (201) is the same for the uniform distribution of heat, as shown in FIG. 11.

Figure 2:
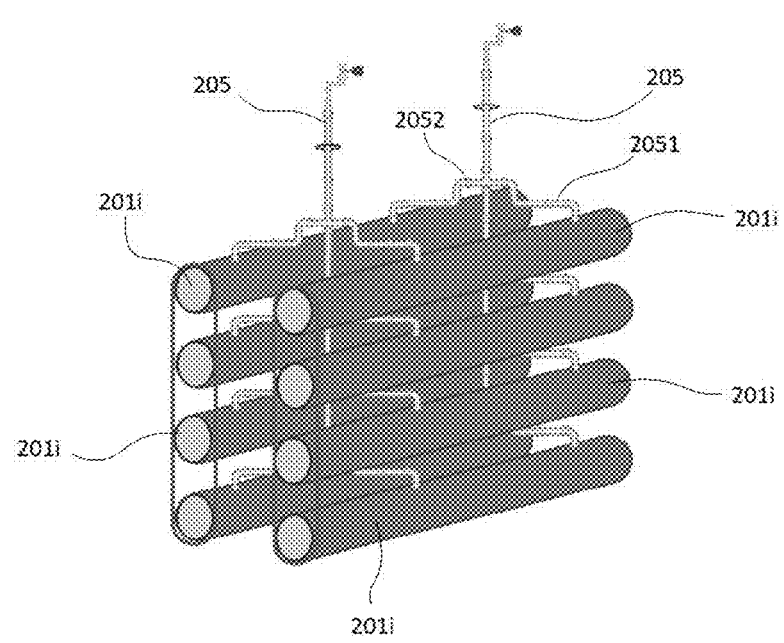
FIG. 2 is a perspective view of the internal pyrolysis chambers of the pyrolytic reactor with its pyrolysis gas uptake system.

Preferably, the shaft (203) of the first inner cylindrical pyrolysis chamber (201*i*) is arranged below the shaft (203) of the first outer cylindrical pyrolysis chamber (201*e*), as shown in FIGS. 2 and 11.

Figure 3:
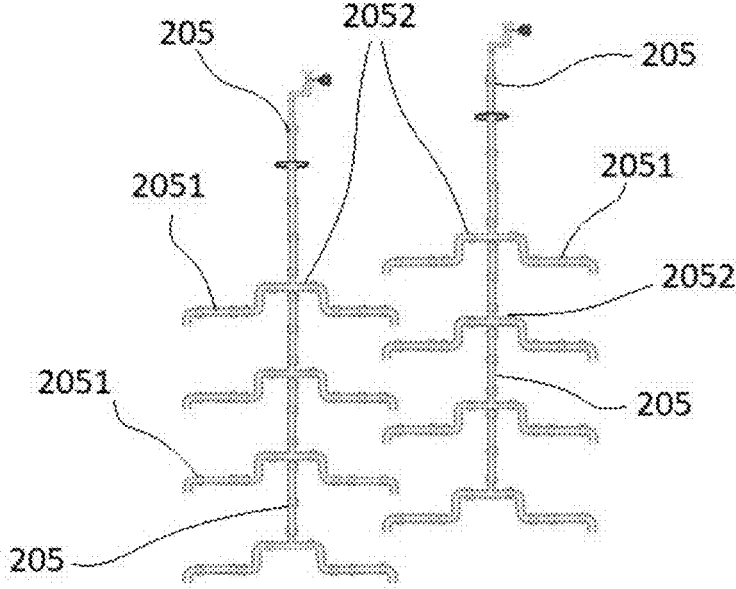
FIG. 3 is a view of the pyrolysis gas uptake system.

Thus, the collection of the pyrolysis gases is carried out by means of at least one lower tube (2051) coupled to each of the inner cylindrical pyrolysis chambers (201*i*) of each of the assemblies (204), the lower tube (2051) being connected to an upper tube (2052) by means of knees and which in turn connects to a vertical tube (205) for collecting the pyrolysis gases, as shown in FIGS. 2 and 3. Preferably two tube assemblies are used for the collection of these vapors.

This configuration allows pyrolysis gases to be collected in the internal pyrolysis chamber (201*i*), which decreases oil condensation within the pipes due to the high temperature provided by the flow of hot air in the central portion of the pyrolysis reactor (200).

In addition, the unevenness caused by the horizontal lower pyrolysis gas collection tube (2051) and the upper tube (2052) prevents the oil, perhaps condensed, from being conducted together with the pyrolysis gas. The unevenness between the pipes causes the condensed oil not to enter the vertical tube (205) for collecting the gases, preventing it from leaving disadvantageously with the gas. Heating also contributes to preventing condensation and facilitates the return of oil to the pyrolysis chambers (201). The unevenness may be accomplished by other means such as, for example, an upward angle in the tube that connects to the internal pyrolysis chamber (201*i*). Therefore, the embodiment of the present invention is not to be interpreted in a limiting manner.

These vapors (liquid effluents) collected by one or more pipes (2051) are sent to a condenser (not shown) that will condense the hydrocarbons (oils) and the non-condensable hydrocarbons exit the condenser in the form of pyrolytic gases that are stored to be consumed as gaseous fuel. Therefore, we have two products resulting from these vapors captured in pyrolysis (oil and gas). And a third is the coal (carbon black) that comes out from underneath, in the last cylinders of the chamber (201*i*) of the pyrolysis reactor (200). Coal also needs to be cooled before it can be stored.

The pyrolytic reactor waste inlet (200) is located at one end of the first outer cylindrical pyrolysis chamber (201*e*) of each of the assemblies and the coal outlet is located at one end of the last inner cylindrical pyrolysis chamber (201*i*) of each of the assemblies (204).

Figure 4:
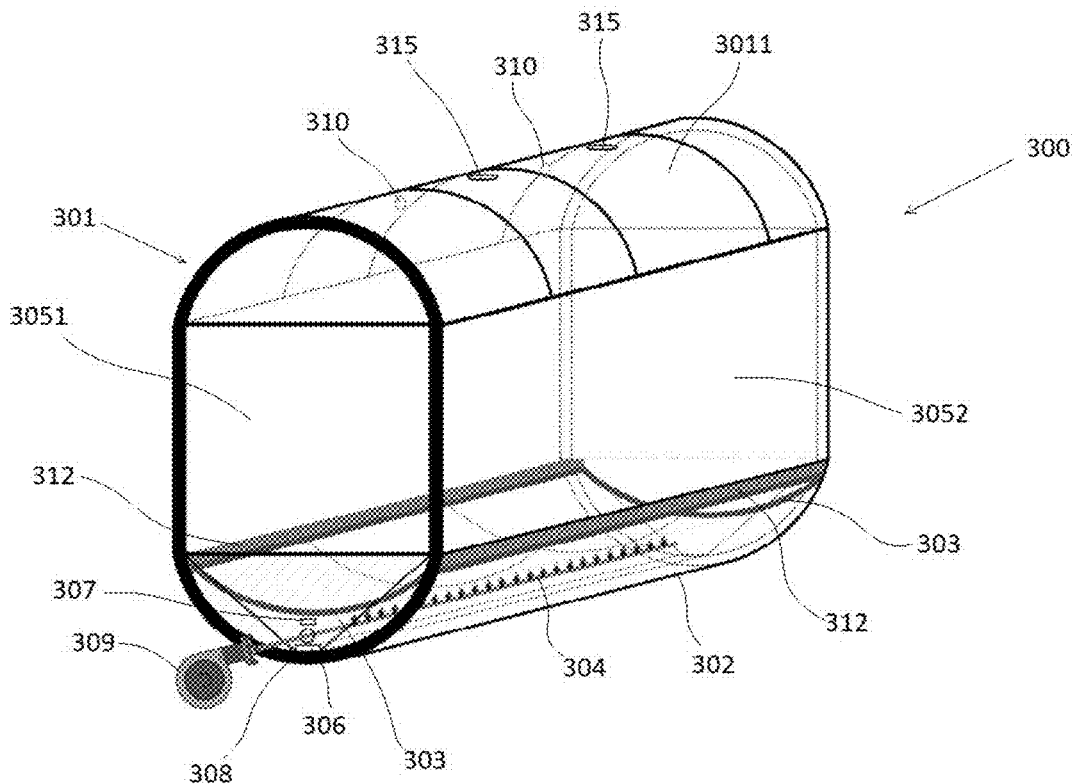
FIG. 4 is a perspective view of the pyrolysis reactor housing.
Figure 6:
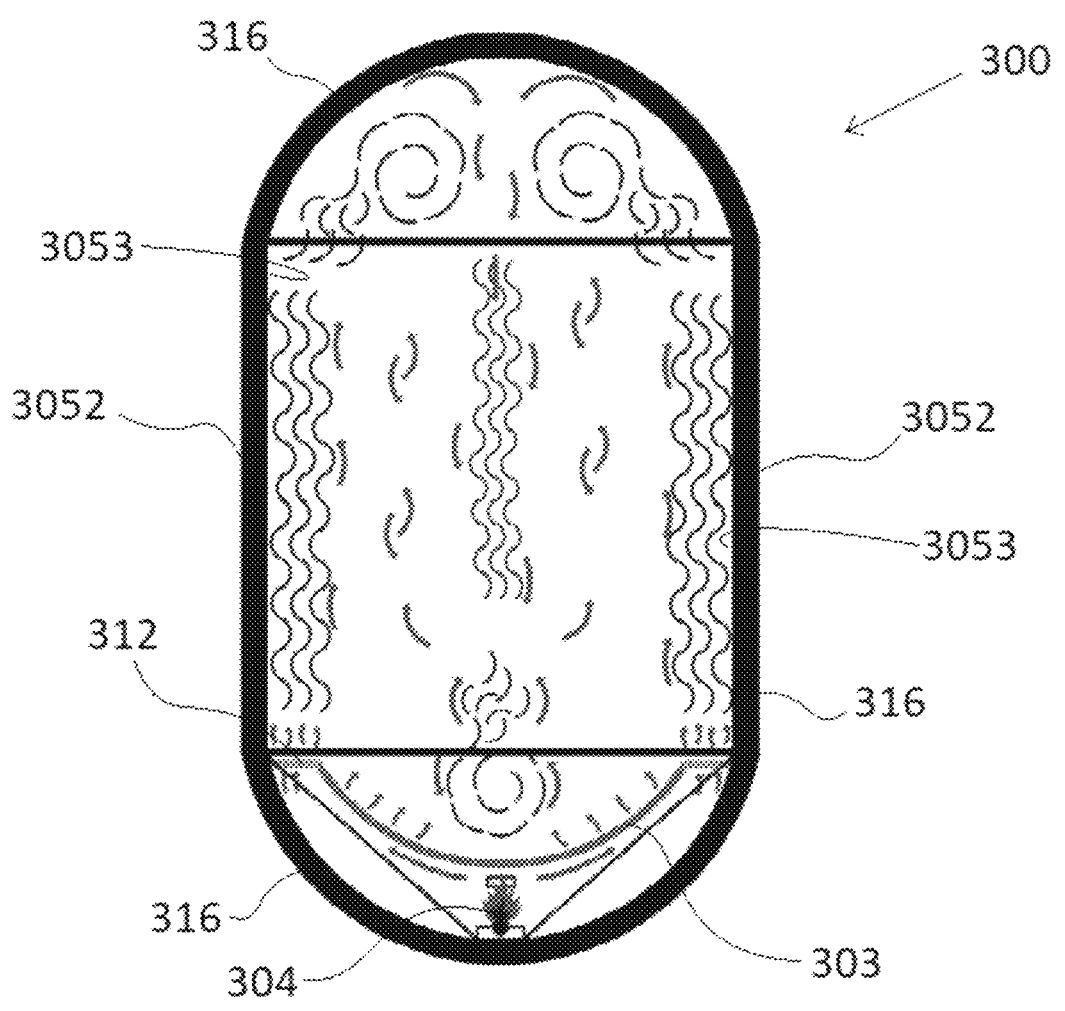
FIG. 6 is a longitudinal cross-sectional view of the pyrolysis reactor housing, highlighting the hot air circulation scheme within it.

The housing (300) has substantially parallelepipedal shape having the closure in the upper portion (301) in substantially the shape of a longitudinal cylindrical section, where the vertex of the upper face (3011) is parallel to the longitudinal axis of the parallelepipedal portion of the housing (300), as shown in FIGS. 4 and 6.

Figure 12A:
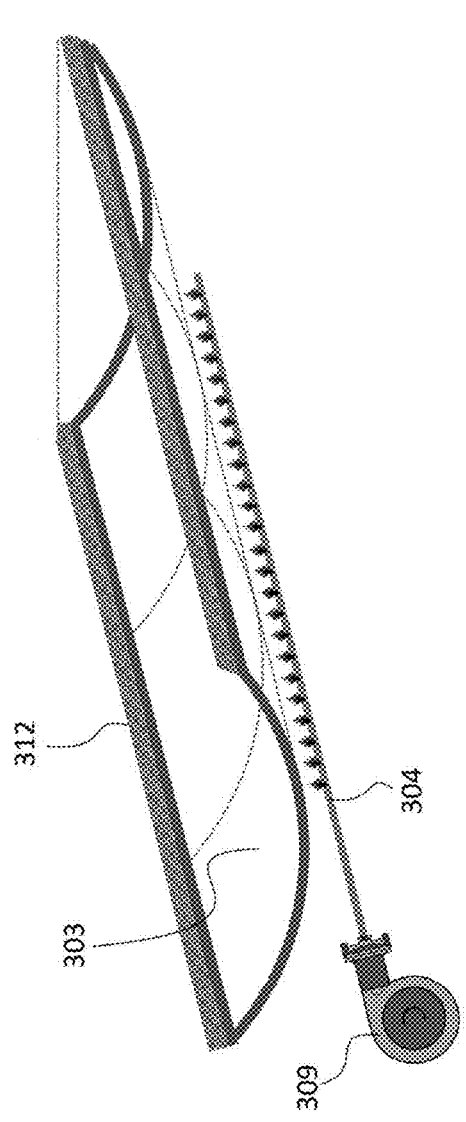
FIG. 12*a* shows the perspective view of the heat diffuser plate, with the burner, the flute and the two horizontal plates of refractory material.

The housing (300) is further provided in its lower portion with a diffuser plate (303) of heat in the shape of a cylindrical surface, its vertex being positioned downwards, being arranged above one or more flutes (304), as shown in FIGS. 4, 6 and 12a.

Figure 12B:
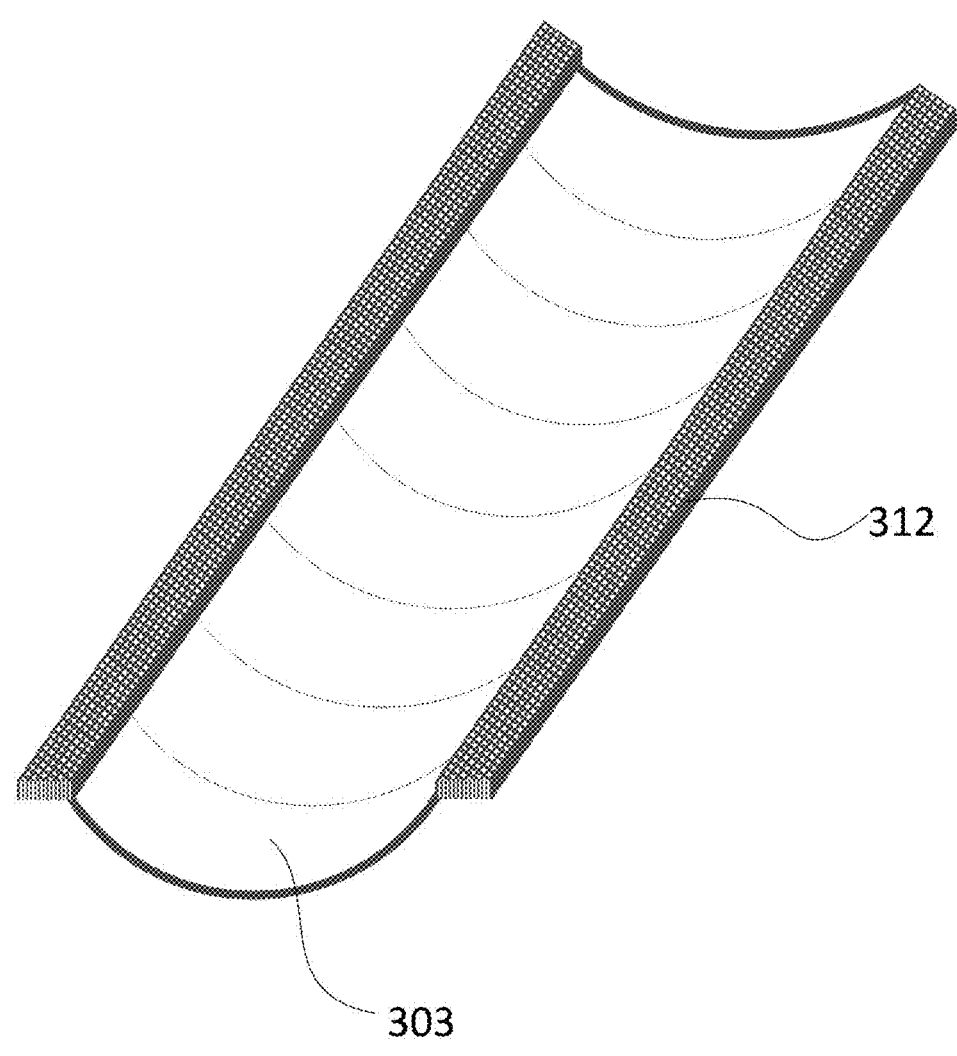
FIG. 12*b* shows another perspective view of the heat diffuser plate with the horizontal plates of refractory material.

The convex diffuser plate (303) assists in distributing heat evenly within the face (300), as shown in FIGS. 6 and 12b. The uniform distribution of heat achieved by the present invention is important for the efficiency of the pyrolysis process achieved by the pyrolysis reactor (200).

Between the edges of the heat diffuser plate (303) and each of the larger inner sides (3053) of the housing (300) is arranged a horizontal plate (312) of refractory material provided with a plurality of holes (3121), as shown in FIGS. 12a, 12b, 12c and 12d.

Through the holes (3121) of the horizontal plate (312) of refractory material, there is a circulation of hot air inside the housing (300), as shown in FIG. 6.

Air circulation is important, since it distributes heat homogeneously between the two assemblies (204) and through the pyrolysis chambers (201) inside the housing (300).

Hot air rises between the larger inner sides (3053) of the housing (300) and the outer pyrolysis chambers (201e) of both assemblies (204). Upon reaching the upper portion (301), the cylindrical shape promotes the conduction of hot air to the center of the housing (300). Then, the hot air currents coming from the sides meet in the upper longitudinal portion of the housing (300). This air, with a slightly lower temperature, descends through the central part of the housing (300) and encounters the heat radiated by the plate (303), which due to its cylindrical surface shape, promotes the heating of the air on a longitudinal axis. This causes hot air to spread inside the housing (300) by means of thermal convection, distributing heat homogeneously through the pyrolysis chambers (201).

The housing (300), in its lower portion of one of its smaller sides (3051), provided with one or more holes (306) for the passage of one or more flutes (304) that couple to one or more gas burners (309), preferably electronic. Said minor side (3051) is further provided with one or more displays (307), immediately above one or more holes (306).

The displays have the function of inspecting the flute flames (304), since it is common to clog one or more flame holes.

Said minor side (3051) is further provided at its lower portion with an opening for collecting ash (308). Due to the work in continuous flow for prolonged periods there is production of a small amount of ash due to the burning of the gas in the flute (304). These ashes fall into the combustion drawer (314) and due to their inverted trapezoidal prismatic shape are routed to the smaller base and accumulate there. Through the opening for the collection of ashes (308) they are from time to time removed.

Figure 7:
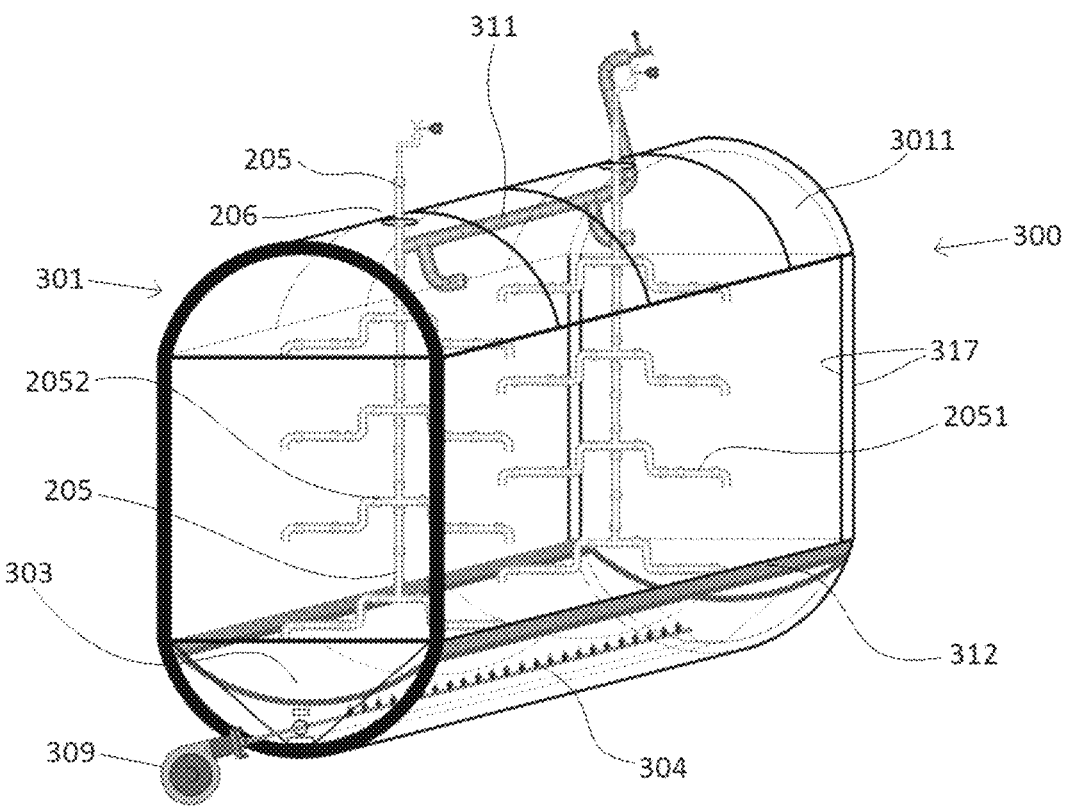
FIG. 7 shows the perspective view of the pyrolysis reactor housing with emphasis on the pyrolysis gas and flue gas collection system.
Figure 8B:
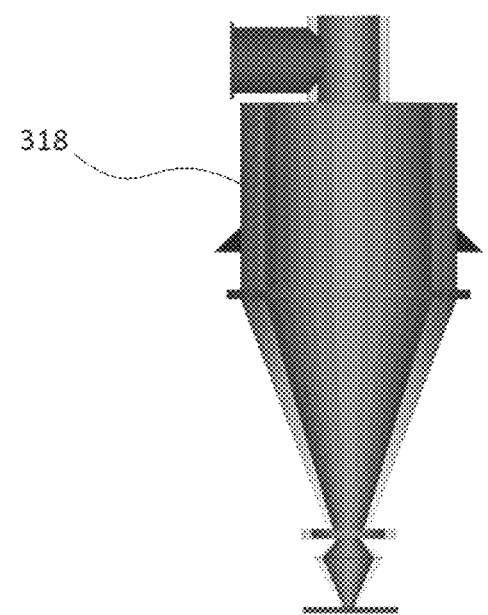
FIG. 8*b* shows cyclone to remove particulates that may come out along with the combustion gases.
Figure 8A:
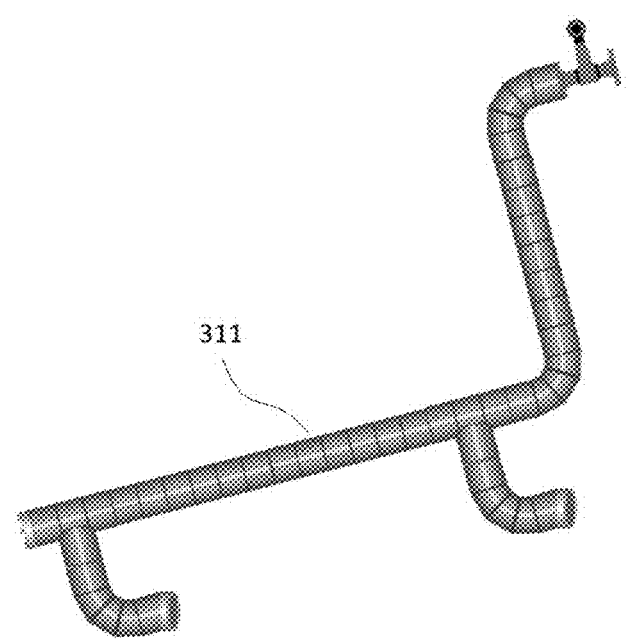
FIG. 8*a* shows the detail of the flue gas collection pipe.

The upper face (301) of the housing (300) further comprises at least one outlet port (310) for coupling one or more flue gas collection tubes (311), as shown in FIGS. 7 and 8a. The ports (310) and flue gas collection tube (311) are sized so that the volume of the inlet gas injected by one or more burners (309) is equal to the volume collected from the flue gases so that there is no considerable pressure within the housing (300), limited to a pressure of 0.1 to 2 bars.

The combustion gases are then treated by means of a cyclone (318) for the removal of any particulate that may have exited through the pipes (311), as shown in FIG. 8b.

Figure 5:
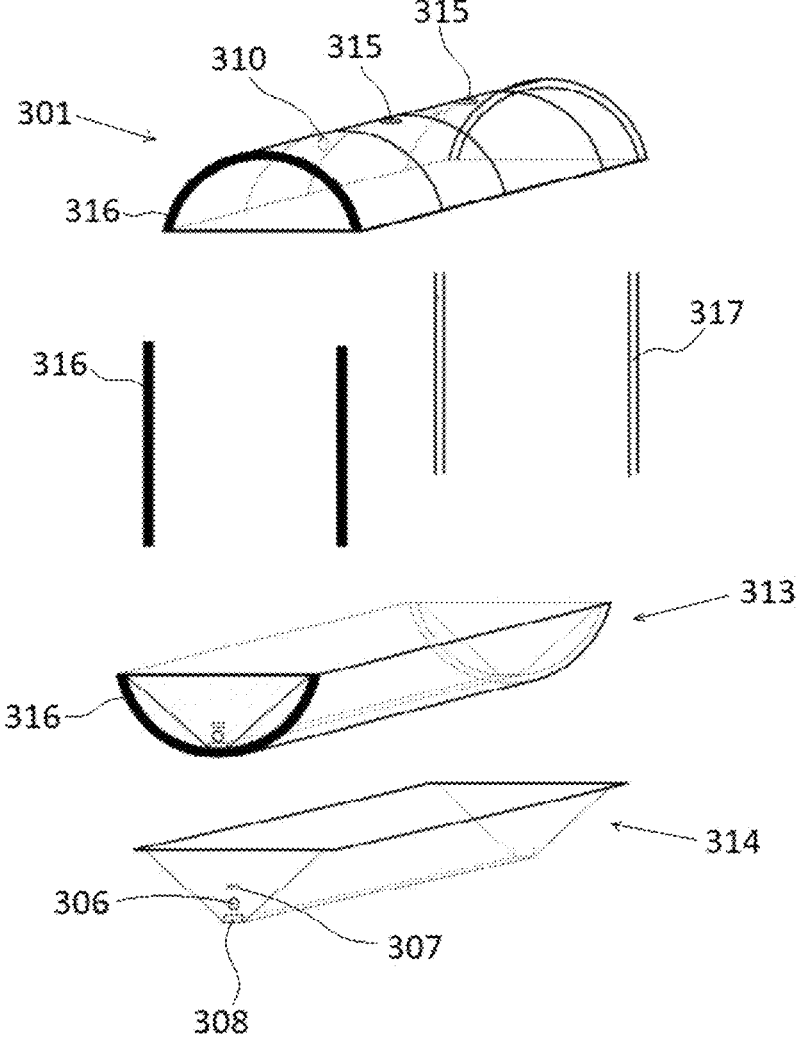
FIG. 5 is an exploded perspective view of the combustion reactor housing of the present invention.

The lower portion (313) of the housing (300) is provided with a combustion drawer (314) in substantially prismatic trapezoidal shape, the smaller base of the trapezoidal prism being positioned at the bottom of the housing (300) and below one or more flutes (304), as shown in FIGS. 4 and 5.

The housing (300) is integrally equipped with double coating, that is, double sheet (317) of metal with thermal insulation (316) inside, as shown in FIGS. 5 and 6. The thermal insulation (316) carried out between the metal plates (317) uses glass wool, rock wool or any more efficient thermal insulator that may be made available by the industry.

The present invention also discloses a positive pressure waste feeder hopper (100) that is disposed above the continuous flow pyrolytic reactor (200).

Figure 9A:
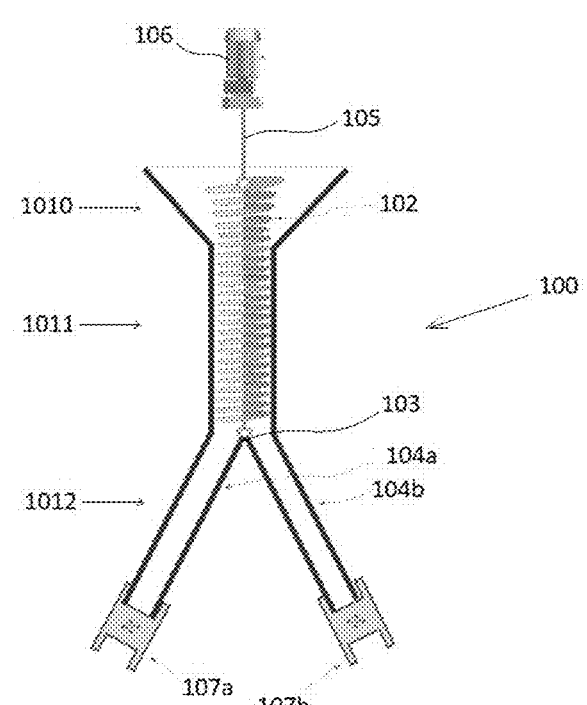
FIG. 9*a* shows the front sectional view of the hopper of the present invention.

The hopper (100) can be better understood by dividing it into three parts, as shown in FIG. 9a. An inverted pyramidal or conical shaped enlarged upper portion (1010) is the location where waste is deposited. This upper portion has its walls distant from the edges of the helical thread (102) for deposition of waste.

The upper portion (1010) is passed longitudinally by a worm thread (102) endless presser in the vertical position, the worm thread (102) being further fixed on a rotating shaft (105) that couples to a rotating means (106), preferably a motor. The upper portion (1010) is limited to the beginning of the vertical tubular portion where the edge of the helical thread (102) is very close to the vertical pipe walls. At the angle formed between the upper portion (1010) and the vertical tubular portion begins the tubular medial portion (1011).

The hopper (100) then comprises a tubular medial portion (1011), narrower than the upper portion (1010), the tubular medial portion (1011) being longitudinally traversed by the worm thread (102). The rotating shaft (105) is coupled by means of a bearing at a fork (103) at the beginning of a lower portion (1012) of the hopper.

At the beginning of the lower portion (1012), that is, at the bifurcation (103) two or more conductive tubes (104a, 104b) of pressed waste that couple to each of the assemblies (204) of the pyrolytic reactor (200) of continuous flow originate.

The bifurcation (103) helps to make a certain retention in the waste, helping in the compaction of the waste and removal of the air.

In the first half of the medial portion (1011) the distance between the edge of the helical pressing thread (102) and the tube should be as small as possible, such as for example 1 to 4 mm, preferably 2 mm. This distance avoids the jamming of waste and promotes the exit of air from them.

At the end of the lower portion are the connectors (107a, 107b) for feeding the continuous flow pyrolytic reactor (200). The connectors (107a, 107b) have a reduction in their diameter of 5 to 30% relative to the diameter of the conductive tubes (104a, 104b) of waste, preferably the reduction is 10 to 15%. This reduction in diameter produces a reduction in the inlet flow of waste in the reactor (200), important for the compaction thereof and the advantageous removal of air.

Thus, the waste enters the reactor very compressed without air and in continuous flow feeding at least two sets (204) of pyrolysis chambers (201).

Figure 9C:
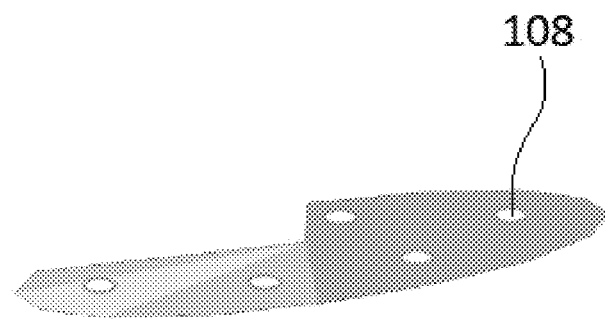
FIG. 9*c* shows the holes of the worm press helical thread.

In order to perform the air withdrawal, the helical thread (102) is provided with a plurality of holes (108). When pressing the material the air is expelled through the holes (108), as shown in FIG. 9*c*. Preferably, each blade of the helical thread (102) is provided with four to six holes.

Figure 9B:
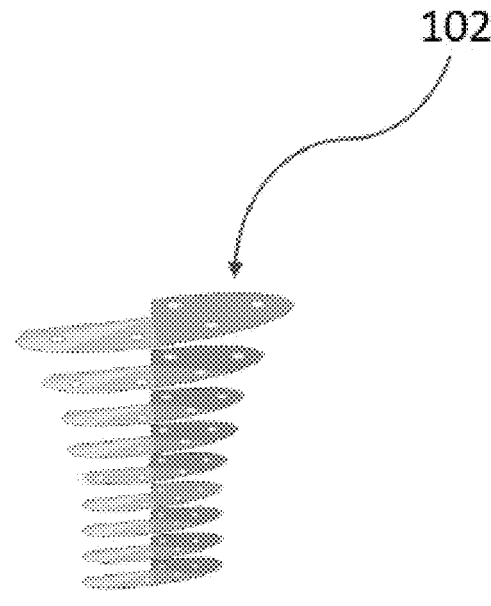
FIG. 9*b* shows the detail of the worm press helical thread.

The helical thread (102) has a larger diameter in the upper portion (1010) relative to the diameter of the helical thread (102) of the medial portion (1011) of the hopper. That is, the first blade has a larger diameter that gradually reduces in the upper portion (1010) of the hopper (100), as shown in FIG. 9*b*.

This arrangement provides the ability of the hopper (100) of the present invention to be able to process in continuous flow the lighter materials, such as grass and cardboard for example. These lighter materials have difficulty being driven by gravity. Thus, the arrangements of the helical thread blades (102) force the entry of waste into the medial portion (1011) of the hopper even for the lightest materials, which present difficulties in the solutions of the state of the art.

The helical thread (102) has a decrease in pitch and diameter from the lower second half of the medial portion (1011). This arrangement increases compression and decreases the chances of waste jamming.

The present invention further discloses a pyrolytic reactor furnace provided with an insulating housing (300) having substantially parallelepipedal shape. The closure in the upper portion (301) of the furnace is shaped substantially from a longitudinal cylindrical section, where the vertex of the upper face (3011) is parallel to the longitudinal axis of the parallelepipedal portion of the housing (300).

The lower portion of the oven is further provided with a diffuser plate (303) of heat in the shape of a cylindrical surface, its apex being positioned downwards. The heat diffuser plate (303) is further disposed above one or more flutes (304), as shown in FIG. 12*a*.

Between the edges of the heat diffuser plate (303) and each of the larger inner sides (3053) of the housing (300) is arranged a horizontal plate (312) of refractory material provided with a plurality of holes (3121), as shown in FIG. 12*b*.

Figure 12C:
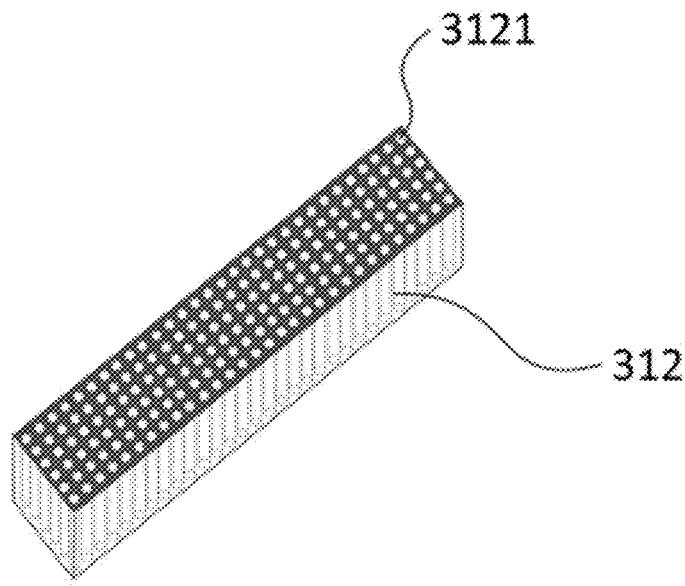
FIG. 12*c* shows a perspective view of the horizontal sheet of refractory material, with details for its holes.
Figure 12D:
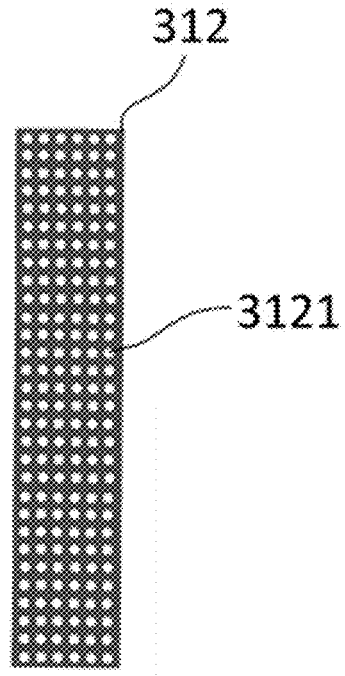
FIG. 12*d* shows a top view of the horizontal sheet of refractory material, with details for its holes.

FIGS. 12*c* and 12*d* show the details of the holes (3121) of the diffuser plate (303) through which hot air from heating carried out by one or more flutes (304) passes.

The present invention further discloses a pyrolysis system comprising a hopper (100) positive pressure waste feeder for the continuous flow pyrolytic reactor (200) passed longitudinally by a worm thread (102) endless presser in the vertical position. Said helical thread (102) is further fixed on a rotating shaft (105) that couples to a motor (106).

The hopper outlet (100) has at least two tubes (104*a* and 104*b*) pressed waste conductors (without air or with very little air). Each tube (104*a* and 104*b*) of the hopper (100) feeds a set (204) of pyrolysis chambers that are disposed within the insulator housing (300).

In order to facilitate the identification of the elements of the present invention, below is the list of numerical references:

100—hopper;
1010—upper portion of the hopper;
1011—tubular medial portion of the hopper;
1012—lower portion of hopper;
102—worm presser helical thread;
103—bifurcation;
104*a* and 104*b*—waste conductor tubes;
105—rotating shaft of the helical thread;
106—rotation means helical thread of the hopper;
107*a* and 107*b*—connectors with the pyrolytic reactor;
108—holes of the worm screw conveyor;
200—pyrolytic reactor;

201—pyrolysis chambers;
201*i*—internal cylindrical pyrolysis chamber;
201*e*—external cylindrical pyrolysis chamber;
202—endless screw conveyor;
203—worm conveyor helical thread shaft;
204—pyrolysis chamber assemblies;
205—vertical tube for collecting pyrolysis gases;
2051—horizontal tube for collecting lower pyrolysis gases;
2052—horizontal tube for collecting the upper pyrolysis gases;
206—orifice for the passage of the pyrolysis gas collection piping;
300—carcass;
301—upper portion of the shaped housing; substantially of a longitudinal cylindrical section;
3011—upper face;
302—lower face (portion) of the carcass;
303—heat diffuser plate;
304—gas flute burner;
3051—smaller sides;
3052—larger sides;
3053—larger internal sides;
306—orifice for passing the flute;
307—display;
308—opening for ash collection;
309—gas burner;
310—port for connecting the flue gas collection piping;
311—flue gas collection piping;
312—horizontal plate of refractory material;
3121—horizontal plate holes;
313—lower portion of the bowl;
314—combustion drawer;
315—orifice for the passage of the vertical piping for collecting pyrolysis gases;
316—thermal insulation;
317—double plate for the entire coating of the carcass;
318—cyclone.

The invention claimed is:

1. A continuous flow pyrolytic reactor (200) comprising:
a plurality of cylindrical pyrolysis chambers (201) equipped inside with an endless helical conveyor thread (202) arranged longitudinally, the endless helical conveyor thread (202) being provided with a shaft (203), said shaft (203) being coupled to bases of the pyrolysis chambers (201); the shaft (203) is further coupled to a rotation device that transfers torque to said shaft (203) by rotating the endless helical conveyor thread (202), the cylindrical pyrolysis chambers (201) are housed in an insulating housing (300) comprising within two or more assemblies (204), each one of the assemblies (204) includes a plurality of the cylindrical pyrolysis chambers (201);
wherein the cylindrical pyrolysis chambers (201) are arranged in an alternately offset direction thereof in each one of the assemblies (204), and wherein the assemblies being arranged in the same direction inside the housing (300).

2. The continuous flow pyrolytic reactor (200) according to claim 1, wherein shafts (203) of the cylindrical pyrolysis chambers (201) of each of the assemblies are arranged on top of each other, wherein the shaft (203) of a first internal cylindrical pyrolysis chamber (201*i*) is located below the shaft (203) of a first external chamber (201*e*).

3. The continuous flow pyrolytic reactor (200) according to claim 2, wherein the collection of pyrolysis gases is carried out by at least one lower tube (2051) coupled to each of the internal cylindrical pyrolysis chambers (201*i*) of each of the assemblies (204), each one of the lower tube (2051) being connected to an upper tube (2052) forming an unevenness; the upper tube (2052) then connects to a vertical tube (205) for collecting the pyrolysis gases.

4. The continuous flow pyrolytic reactor (200) according to claim 2, wherein a waste inlet is located above one of the ends of the first external cylindrical pyrolysis chamber (201*e*) of each of the sets and the coal outlet is located underneath one of the ends of the last inner cylindrical pyrolysis chamber (201*i*) of each of the assemblies (204).

5. The continuous flow pyrolytic reactor (200), according to claim 1, wherein the housing (300) has a parallelepipedal shape having the closure at the upper portion (301) in the shape a longitudinal cylindrical section, where a vertex of an upper portion (3011) is parallel to the longitudinal axis of the parallelepipedal portion of the housing (300).

6. The continuous flow pyrolytic reactor (200) according to claim 5, wherein the housing (300) is provided in a lower portion with a heat diffusing plate (303) in the shape of a cylindrical surface, its vertex positioned downwards, being arranged above one or more flutes (304).

7. The continuous flow pyrolytic reactor (200) according to claim 6, wherein between the edges of the heat diffusing plate (303) and each of larger inner sides (3053) of the housing (300) is arranged on a horizontal sheet (312) of refractory material provided with a plurality of holes (3121).

8. The continuous flow pyrolytic reactor (200), according to claim 5, wherein the housing (300), in a lower portion of a small side (3051), includes one or more holes (306) for the passage of one or more of flutes (304) that are coupled to one or more gas burners (309), the small side (3051) includes one or more visors (307), immediately above one or more holes (306); said small side (3051) includes a lower portion with an opening for collecting ash (308).

9. The continuous flow pyrolytic reactor (200) according to claim 5, wherein the upper face (301) comprises at least one outlet hole (310) for coupling a flue gas collection pipe (311).

10. The continuous flow pyrolytic reactor (200) according to claim 9, wherein one or more flue collection ports (310) are sized in such that the volume of the inlet gas injected by one or more burners (309) is equal to the volume of the flue gases collected in the one or more ports (310).

11. The continuous flow pyrolytic reactor (200) according to claim 6, wherein the lower portion (313) of the housing (300) is provided with a combustion drawer (314) having a prismatic trapezoidal shape, with a smaller base being positioned at the bottom of the housing and below the one or more flutes (304).

12. A feeder hopper (100) with positive pressure to the continuous flow pyrolylic reactor (200) according to claim 1, the feeder hopper (100) provided with an enlarged upper portion (1010) where the waste is deposited; the upper portion (1010) is passed longitudinally by a helical thread (102) endless presser in the vertical position, the helical thread (102) and further fixed to a rotating shaft (105) that couples to a rotating device (106), the hopper (100) comprises a tubular medial portion (1011), narrower than the upper portion (1010), and the tubular medial portion (1011) is passed longitudinally by the helical thread (102); the rotating shaft (105) is coupled by a bearing in a bifurcation pipe (103) at the beginning of a lower portion (1012) of the hopper; the bifurcation pipe (103) originates from pipes (104).

13. The feeder hopper (100) according to claim 12, wherein the connectors (107*a*, 107*b*) for feeding the continuous flow pyrolytic reactor (200) have a reduction in a diameter of 5 to 30% in relation to a diameter of the waste conduction tubes (104*a*, 104*b*).

14. The feeder hopper (100) according to claim 12, wherein the screw thread (102) is provided with a plurality of holes (108).

15. The feeder hopper (100) according to claim 12, wherein the helical thread (102) has a larger diameter in the upper portion (1010) in relation to a diameter of the helical thread (102) of a medial portion (1011) of the hopper, wherein said diameter is gradually reduced to the beginning of the medial portion (1011).

16. The feeder hopper (100) according to claim 12, wherein the helical screw (102) has a decrease in pitch and diameter from a lower second half of the medial portion (1011).

17. A pyrolytic reactor furnace provided with the continuous flow pyrolytic reactor (200) according to claim 1, wherein the insulating housing (300) has a parallel shape, wherein a closure in an upper portion (301) is shaped longitudinal as a cylindrical section, where a vertex of an upper face (3011) is parallel to a longitudinal axis of the parallelepipedal portion of the insulating housing (300), a lower portion being provided with a heat diffusing plate (303) in the form of a cylindrical surface, a vertex being positioned downwards; the heat diffuser plate (303) is further arranged above one or more flutes (304).

18. The pyrolytic reactor furnace, according to claim 17, wherein between the edges of the heat diffuser plate (303) and each of the larger inner sides (3053) of the housing (300) is arranged a horizontal plate (312) made of a refractory material provided with a plurality of holes (3121).

* * * * *